United States Patent
Salters et al.

(10) Patent No.: US 8,534,868 B2
(45) Date of Patent: Sep. 17, 2013

(54) SYSTEM OF COLLIMATED ARRAY OF LIGHT EMITTERS

(75) Inventors: Bart Andre Salters, Eindhoven (NL); Marcellinus Petrus Carolus Michael Krijn, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 21 days.

(21) Appl. No.: 13/375,680

(22) PCT Filed: Jun. 8, 2010

(86) PCT No.: PCT/IB2010/052529
§ 371 (c)(1), (2), (4) Date: Dec. 1, 2011

(87) PCT Pub. No.: WO2010/143127
PCT Pub. Date: Dec. 16, 2010

(65) Prior Publication Data
US 2012/0075856 A1    Mar. 29, 2012

(30) Foreign Application Priority Data
Jun. 12, 2009   (EP) ..................................... 09162610

(51) Int. Cl.
*F21V 13/00*    (2006.01)

(52) U.S. Cl.
USPC ............................................ 362/243; 362/247

(58) Field of Classification Search
USPC .................................................... 362/243, 247
See application file for complete search history.

(56) References Cited

U.S. PATENT DOCUMENTS
2009/0141212 A1   6/2009   Harbers et al.

FOREIGN PATENT DOCUMENTS
EP         1684111 A1   7/2006
WO    2008068718 A2   6/2008

*Primary Examiner* — Joseph L Williams
(74) *Attorney, Agent, or Firm* — Shimokaji & Assoc., PC

(57) ABSTRACT

The invention relates to an array of light generators where each light generator comprises reflecting collimation optics in the form of curved mirrors for collimating light emitted by light sources such as surface mounted Light Emitting Diodes. The collimation optics is formed to collimate light in a direction parallel with a plane, e.g. a printed circuit board, onto which the light sources are mounted. The light sources may emit light parallel with the direction of collimation or non-parallel, e.g. perpendicular, with the direction of collimation in which case the collimation optics redirects the light rays from the light source. The array of light generators can be used in combination with a television display for creating a pixelated image appearing to the viewer as an image peripherally surrounding the display.

12 Claims, 5 Drawing Sheets

SYSTEM OF COLLIMATED ARRAY OF LIGHT EMITTERS

FIELD OF THE INVENTION

The invention relates to light emitters, and in particular to an array of light emitters for creation of an array of light spots.

BACKGROUND OF THE INVENTION

It is known to enhance the viewing experience when watching images on television displays by combining an image formed on the display with a pixelated image formed on the wall behind the television display. The pixelated images may be created by an array of light emitters arranged on the back side of the display. As displays become narrower, it would be desirable also to make the array of light emitters more compact.

WO2008/068718 discloses an ambient lighting system for a display device including an image display region. Controllable light sources that are substantial point-like and disposed in an array are provided, each being adapted to emit a light beam of at least one wavelength onto a region visually appearing to the viewer peripherally surrounding the display. Due to the substantial point-like property of the light sources along with their arrangement within the array the emitted light beams onto the region forms a pixelated image so as to provide at least a partial extension of the image display region.

Whereas WO2008/068718 discloses an array of light emitters for creation of a pixelated image, it is an objective to obtain a light emitter array which is more compact.

SUMMARY OF THE INVENTION

Accordingly, the invention preferably seeks to alleviate or eliminate the above mentioned disadvantage and possibly other disadvantages. In particular, it may be seen as an object of the present invention to provide a light emitter array which is compact but still offers high quality light beams.

This object and several other objects are obtained in a first aspect of the invention by providing a light emitter array for generating a plurality of output light beams, the light emitter array comprising, first and second light emitters having first and second directions of light propagation,
first and second collimating reflectors arranged to collimate the emitted light from the first and second light emitters along first and second collimation directions,
first and second redirection reflectors arranged to change directions of the collimated light propagating along the first and second collimation directions into first and second output directions for generation of first and second output light beams.

The invention is particularly, but not exclusively, advantageous for obtaining a compact light emitter array capable of producing an array of collimated output light beams. By providing redirection reflectors, the orientation of collimating reflectors is not bounded by the required direction of the output beams and, therefore, the collimating reflectors can be oriented to form a compact light emitter array. Further, since the collimating reflectors can be oriented more flexible, a longer length of the collimating reflectors may be allowed which may enable highly collimated output beams.

In an embodiment the first and second light emitters are located on a plane, and the first and second primary collimating reflectors are arranged to collimate light along the first and second collimation directions extending substantially parallel with the plane. It may be advantageous to collimate light along a plane, e.g. a printed circuit board, to form a light emitter array which has a low height in a direction away, e.g. perpendicular, to the plane.

In an embodiment the first redirection reflector and the second collimation reflector are arranged on a plane, and a space formed between the first redirection reflector and the plane accommodates part of the second collimation reflector. Thus, the footprint of the first and second light emitter units may be reduced by allowing the first redirection reflector to overlap with the second collimation reflector.

In an embodiment the first and second primary collimating reflectors are arranged to change the direction of light propagation along the first and second directions of the first and second light emitters into first and second collimation directions. It may be advantageous to configure the collimating reflectors to change the direction of light emitted by the light emitters simultaneously with collimating the light since this allows use of light emitters which does not emit light in the collimating direction, for example this allows mounting of top-emitting light emitters on the plane onto which the collimating reflectors may be mounted.

In an embodiment the first and second collimation directions are substantially parallel. The light emitters and the collimating reflectors may be mounted identically on a plane, e.g. a printed circuit board, so that collimation directions are substantially parallel within natural deviations. The light emitters and/or the collimating reflectors may also be mounted so that the collimating directions intentionally deviates a few degrees from each other, e.g. up to 10 degrees, in order to displace light spots formed on a wall slightly from neighboring spots.

In an embodiment the first and second collimating reflectors are distributed on line to form a column of the light emitter units. The first and second light emitter units and, consequently, the first and second collimating reflectors, may advantageously be distributed along a column to form a compact light emitter array. A single column of light emitter units may be arranged to form a two-dimensional array—such as an m-by-n array—of light spots by configuring e.g. the redirection reflectors with different reflection angles to form a two-dimensional array of light spots. Alternatively, a plurality of columns of light emitter units may be formed to generate a two-dimensional array of light spots.

In an embodiment the first and second collimating reflectors are curved in only one plane for collimating light in only one dimension. It may be advantageous to collimated light in only one direction, for example for generation of elliptical spots on the wall. However, it is understood that the collimating reflectors may also curved in two planes for collimating light in two dimensions, possibly with different degrees of collimation in the two dimensions.

In an embodiment the first and second redirection reflectors may advantageously be formed as flat mirrors for providing a simple light emitter array. However, the redirection reflectors may alternatively be formed as curved reflectors for further collimation of the light beams and/or for shaping the light beams for forming specifically shaped spots on the wall.

A second aspect of the invention relates to display device comprising, a display for displaying images, and
a light emitter array according to the first aspect.

By combining a display with a light emitter array, the light emitter array may advantageously enhance the viewing experience by extending the image on the display to be formed also on the wall. By use of a control device for electrically controlling the light emitters of the light emitter array in dependence of electronic signals controlling the formation of the display image, a matrix of light spots can be formed on the wall surrounding the display which sort of mimics the image displayed on the display.

In an embodiment according to the second aspect, the light emitter array is arranged along an edge of the display device so that light from the first and second light emitters is collimated in a direction substantially parallel with the edge of the display. Advantageously, be collimating light parallel with an edge of the display, the light emitters array can be made more compact so that the light emitter array is not responsible for increasing the thickness of the display device.

In an embodiment according to the second aspect, the first and second collimating reflectors and the first and second redirection reflectors are distributed in line along an edge of the display device. The first and second light emitter units and, consequently, the first and second collimating reflectors, may advantageously be distributed along a column arranged parallel with an edge of the display to form a compact light emitter array. A single column of light emitter units may be arranged to form a two-dimensional array—such as an m-by-n array—of light spots by configuring e.g. the redirection reflectors with different reflection angles to form a two-dimensional array of light spots. Alternatively, a plurality of columns of light emitter units may be arranged along an edge of the display to generate a two-dimensional array of light spots.

A third aspect of the invention relates to a method for generating an array of output light beams, the method comprising, generating first and second light beams from first and second light emitters having first and second directions of light propagation, collimating the first and second light beams using first and second collimating reflectors arranged to collimate the light beams along first and second collimation directions, redirecting the collimated light propagating along the first and second collimation directions into first and second output directions using first and second redirection reflectors for generation of first and second output light beams.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1A:
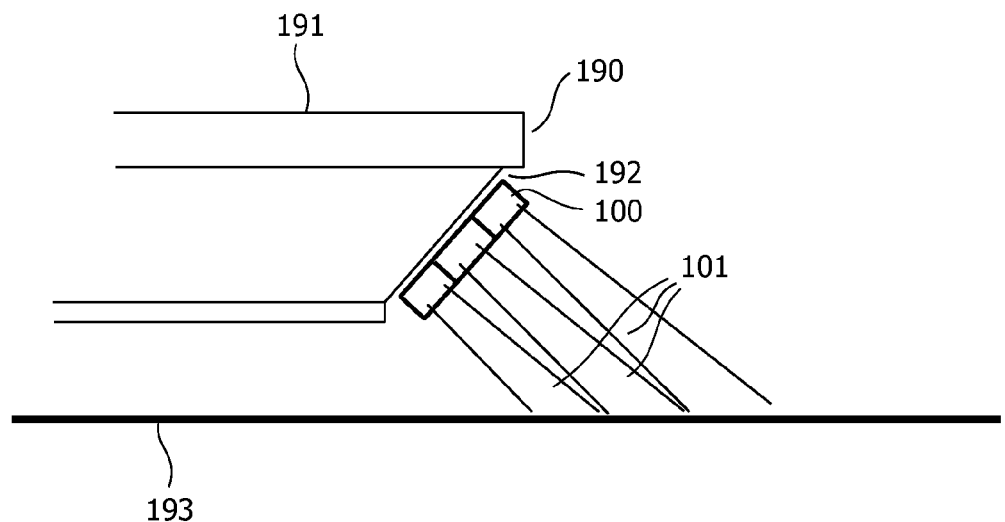
FIG. 1A shows a display device with a light emitter array.

FIG. 1A shows an application of a light emitter array 100 as an ambient light source on a display device 190. The display device 190 may be a television display, for example an LCD display comprising a display 191 for displaying images. The light emitter array 100 may be fixed to or integrated with an edge 192 of the display for projection of output light beams 101 onto e.g. a wall 193 located behind the display device 190.

Figure 1B:
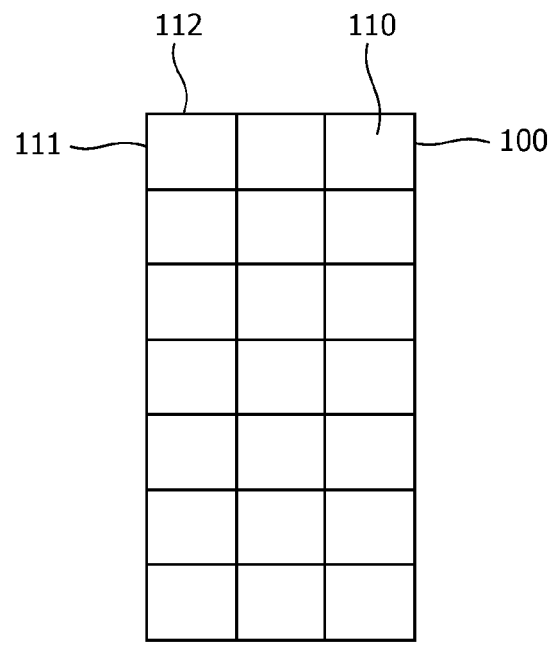
FIG. 1B shows arrangement of emitter units as a matrix of individual units.

FIG. 1B shows that the light emitter array 100 comprises a plurality of light emitter units 110 arranged in rows 111 and columns 112. Each light emitter unit 110 may be capable of illuminating the wall 193 with a light spot. The color of emitted light from each emitter unit 110 may be adjustable or fixed. Accordingly, the light emitter array 100 is capable of generating an array of light spots on the wall 193, for example an array of 3 by 8 spots.

In order to produce well defined spots on the wall which are not to large in diameter, it is required to collimate light generated by light sources such as light emitting diodes. Since collimation optics takes up space in an array of light emitters it is a challenge to design an array of light emitters capable of generating collimated light. Thus, whereas an array of light emitters can be made compact, it is more challenging to make a compact array of light emitter units having integrated collimation optics.

Figure 2A:
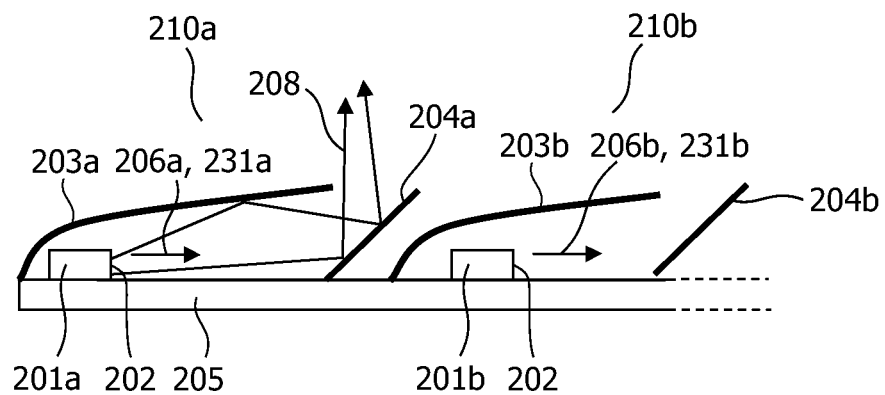
FIGS. 2A-B show reflector components and light emitters of the light emitter units.

FIG. 2A shows first and second light emitter units 210a, 210b being part of a column 112 of the light emitter array 100. The emitter units 210a, 210b comprises first and second light emitters 201a, 201b, first and second collimating reflectors 203a, 203b, and first and second light reflectors 204a, 204b, respectively. The components of the light emitter units 210a, 210b may be mounted onto a plane 205, for example a printed circuit board.

The light emitters 201a, 201b may be edge emitting light sources configured to emit light through edges 202, so that the first and second light emitters 201a, 201b have first and second directions of light propagation 206a, 206b, respectively. The directions of light propagation 206a, 206b for edge emitting emitters 201a, 201b are substantially parallel to the plane 205 within some manufacturing tolerances.

Figure 2B:
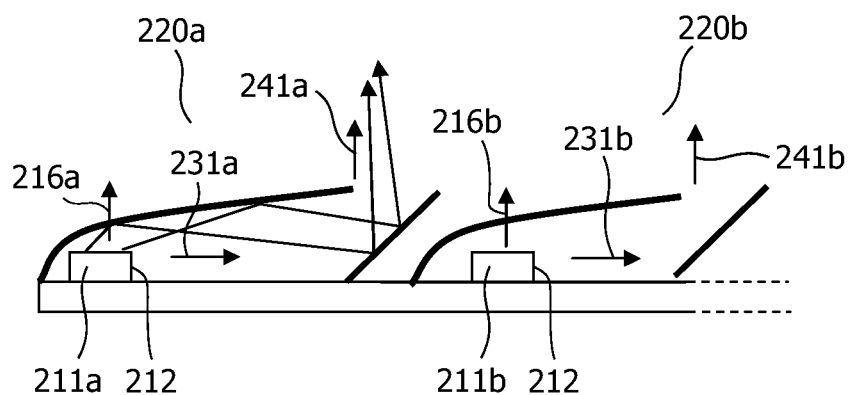

FIG. 2B shows first and second light emitter units 220a, 220b which are identical to the first and second light emitter units 210a, 210b of FIG. 2A, except that the light emitters 211a, 211b are top-emitting light sources configured to emit light through top faces 212, so that the first and second light emitters 220a, 220b have first and second directions of light propagation 216a, 216b, respectively. The directions of light propagation 216a, 216b for the top-emitting emitters 211a, 211b are substantially perpendicular to the plane 205 within some manufacturing tolerances.

The directions of light propagation 206a, 206b and 216a, 216b are understood as an average direction of all diverging light rays emitted by the light emitters 201a, 201b or 211a, 211b. Therefore, the exact average directions of light propagation are typically different for different light emitters.

The first and second collimating reflectors 203a, 203b have first and second collimation directions 231a, 231b (illustrated in FIG. 2C) extending in a direction substantially parallel with the plane 205 and in the direction of light propagation 206a, 206b of the edge-emitting emitters 201a, 201b. It is understood that collimation directions 231a, 231b may only be approximately parallel with the plane 205 and the directions of light propagation 206a, 206b due to tolerances of the light emitters and the collimating reflectors or other deviations of the collimation directions. Thus, the full functionality of the light emitter array is still obtained if the collimation directions deviates a few degrees, e.g. 2 degrees with respect to each other. The first and second collimation directions 231a, 231b are substantially parallel in the above meaning.

Figure 2C:
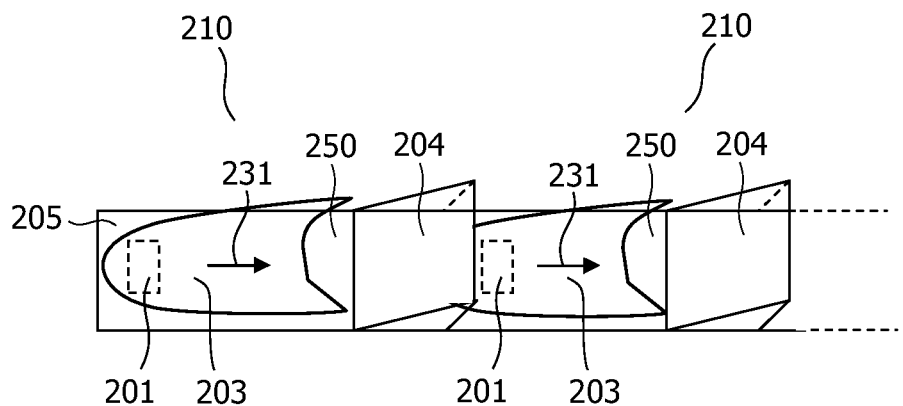
FIG. 2C shows a perspective view of the light emitter units.

FIG. 2C shows a perspective view of the first and second light emitter units 210 (210a, 210b or 220a, 220b) comprising the light emitters 201, collimating reflectors 203 and redirection reflectors 204 mounted on the plane 205. For convenience, the first and second light emitter units 210a, 210b or 220a, 220b will be referred to as light emitter units 210 in common, and components of the light emitter units 210 will be referred to as e.g. light emitters 201 instead of first and second light emitters 201a, 201b whenever it is not necessary to distinguish between components of the first and second light emitter units 210a, 210b, 220a, 220b.

The collimating reflectors 203 (203a, 203b) are arranged to collimate emitted light from the light emitters 201. Thus, the collimating reflectors 203 reduces the angular spreading of light rays emitted by a light emitter 201 so as to obtain a collimated bundle of rays 208 with a reduced angular spreading as compared to the original spreading of emitted light from emitters 201. Each collimated bundle of rays 208 forms an output light beam 101, and the plurality bundles of collimated rays 208 outputted from the plurality of light emitter units 210a, 210b forms an array of output light beams 101 to be projected onto a wall. Whether the light emitters emit light through edge-faces 202 or top-faces 212, the collimating reflectors 203 collimates light along the collimation direction 231, i.e. parallel with the plane 205. Accordingly, when light is emitted through top-faces 212, in directions 216a, 216b substantially perpendicular to the plane 205, the collimating reflectors additionally changes the direction of light propagation 216a, 216b of the top-emitting emitters 201 into the collimation direction 231.

The redirection reflectors 204, 204a, 204b are arranged to change the directions of the collimated light propagating along the first and second collimation directions 231a, 231b into respective first and second output directions 241a, 241b. The redirected light beams 208 constitute output beams that may project onto the wall 193. The output beams are outputted by the light emitter units 210 through openings 250 formed between the collimating reflectors 203 and the redirection reflectors 204.

As shown in FIG. 2C the light emitter units 210, the light emitters 201, the collimating reflectors and the redirection reflectors are distributed on line to form a column 112 of the light emitter array 100. By arranging columns 112 next to each other as shown in FIG. 1B, a two-dimensional array of light emitter units 210 is formed which are capable of creating a two-dimensional array of light spots, for example a 2×8 array, a 3×8 array or in general a n×m array of light spots.

Figure 3:
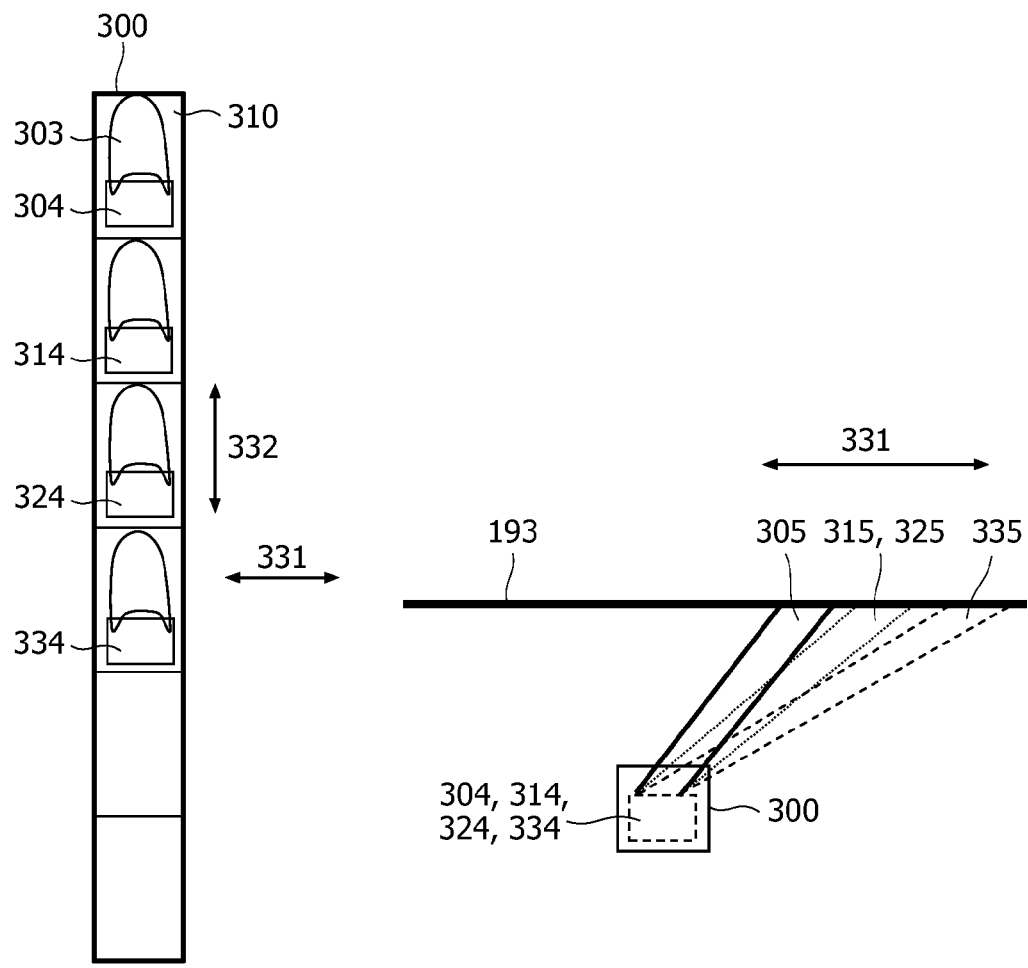
FIG. 3 illustrates a light emitter array for creating a two-dimensional array of light spots on a wall from a single column of emitter units.
Figure 3:
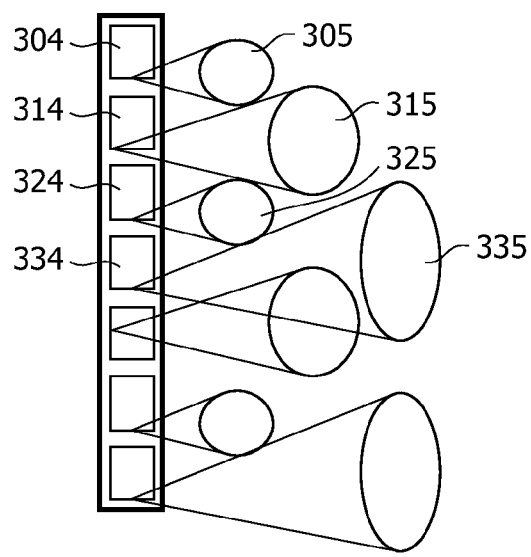

FIG. 3 illustrates an alternative light emitter array 300 for creating an n×m array of light spots on a wall 193 from a single column of n-times-m light emitter units 310 arranged on line along direction 332 (top view figure to the left). Each light emitter unit 310 comprises a collimating reflector 303 and a redirection reflector 304, 314, 324, 334. In order to create a two-dimensional array of light spots from the one dimensional array of light emitter units 310, the redirection reflectors 304, 314, 324, 334 are angled to form spots 305, 315, 325, 335 displaced along a direction 331 perpendicular to the direction 332 of light emitter units 310 as illustrated in the front view figure to the right. The redirection reflectors 304, 314, 324, 334 may be angled in various ways relative to each other to obtain various distributions of spots in a two-dimensional array. FIG. 3, bottom, shows one example of angling the redirection mirrors so as to fill out the wall with spots of light by displacing spots at different distances along the direction 331. The different sizes and elliptic shapes of the spots may be obtained by shaping the curvature of the collimation reflectors and/or the redirection reflectors to generate such differently shaped spots.

Figure 4A:
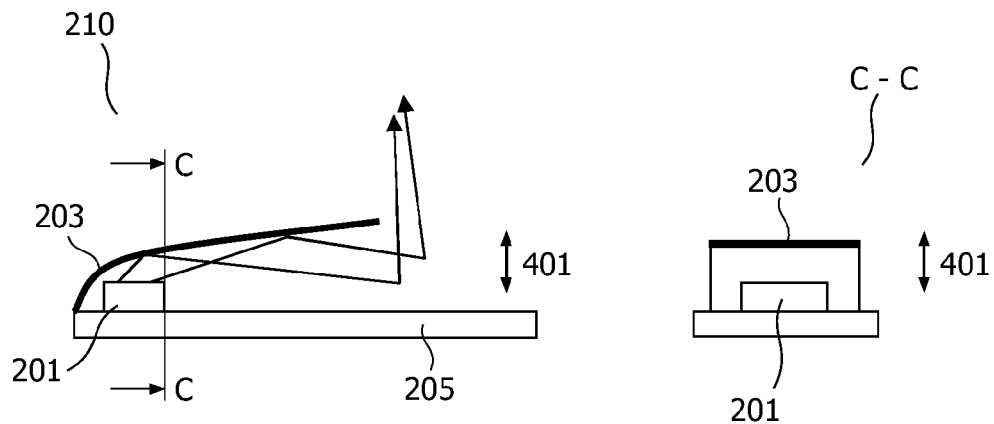
FIGS. 4A-B show that the collimating reflector may be curved in one dimension or in two dimensions.
Figure 4B:
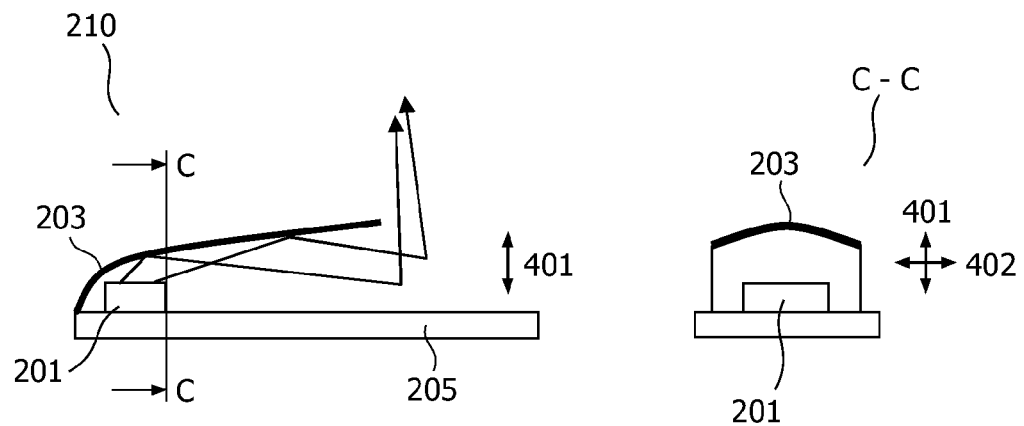

FIG. 4A and FIG. 4B shows side views of a light emitter unit 204 to the left and views along the CC-cutting line to the right. FIG. 4A shows that the collimation reflectors 203 are curved in only one plane for reducing spreading of light in a first direction 401 perpendicular to the plane 205. FIG. 4B shows that collimation reflectors 203 may be curved in both a first plane and a second plane for reducing spreading of light in both the first direction 401 and a second direction 402 parallel to the plane 205. Accordingly, the collimating reflector 203 in FIG. 4A is capable of collimating the light from the light emitter 204 in one dimension, whereas the collimating reflector 203 in FIG. 4B is capable of collimating in two dimensions.

The redirection reflectors 204 may be plane or flat mirrors for only redirecting light beams. Alternatively, the redirection mirrors may be curved mirrors for both redirecting light beams and for changing the spreading of reflected light. For example, the redirection mirrors may be curved for further collimation of the light being initially collimated by the collimation reflectors. The redirection reflectors 204 may be curved in one plane or two planes for collimating light in one or two dimensions. The redirection reflectors may even be curved or shaped in highly irregular forms, for example the redirection reflectors may be provided locally with tilted and curved parts for creation of special light beam effects.

Figure 5:
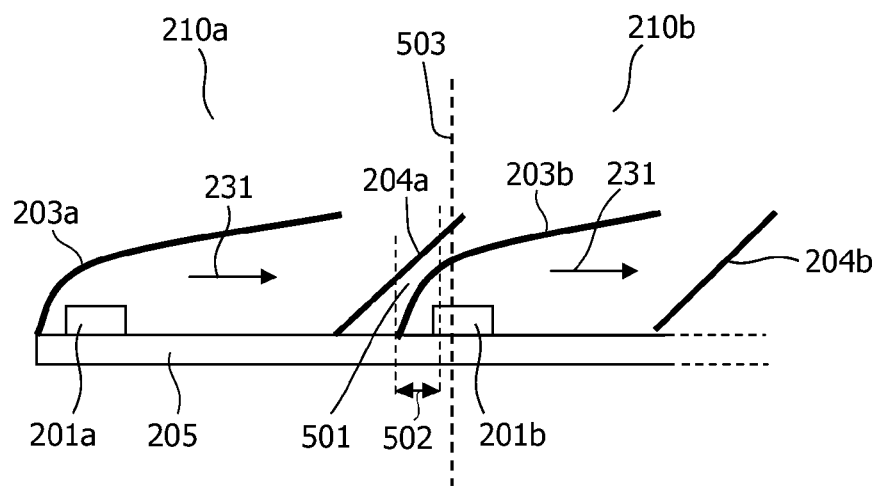
FIG. 5 shows how the footprint occupied by light emitter units can be reduced by utilizing empty space between adjacent light emitter units.

FIG. 5 shows the first redirection reflector 204a of the first light emitter unit 210a and the second collimation reflector 203b of the second light emitter unit 210b arranged on the plane 205. The first redirection reflector 204a is angled, e.g. at an angle of 45 degrees, with respect to the plane 205 and, therefore, extends in a direction parallel with the plane 205 and parallel with the column 112 of light emitter units 210a, 210b. The backside of the redirection reflector 204a, opposite to the reflecting side, and the plane 205 constitutes an imaginary empty space 501 wherein light from light emitters 201 does not propagate. Thus, the row of light emitter units 210 can be made more compact by placing the second collimation reflector 203b close to the first redirection reflector 204a by minimizing the distance between the back sides of first redirection reflector 204a and the second collimation reflector 203b, so that part of the space 501 formed between the first redirection reflector 204a and the plane 205 accommodates part of the second collimation reflector 203b, i.e. provides room for part of the second collimation reflector. Thus, space is saved by arranging components of the light emitter units, so that the first redirection reflector 204a accommodates part of the second light emitter unit 210b and possibly accommodates the second light source 201b. In other words, the non-reflecting face of the first redirection reflector 204a extends a distance 502 beyond and above the non-reflecting face of the adjacent second collimation reflector 203b. To explain this space saving advantage in other words, both the first redirection reflector 204a, and the second collimation reflector 203b, and possibly the second light emitter 201b, extends through an imaginary plane 503 being perpendicular the general collimation direction 231.

Figure 6:
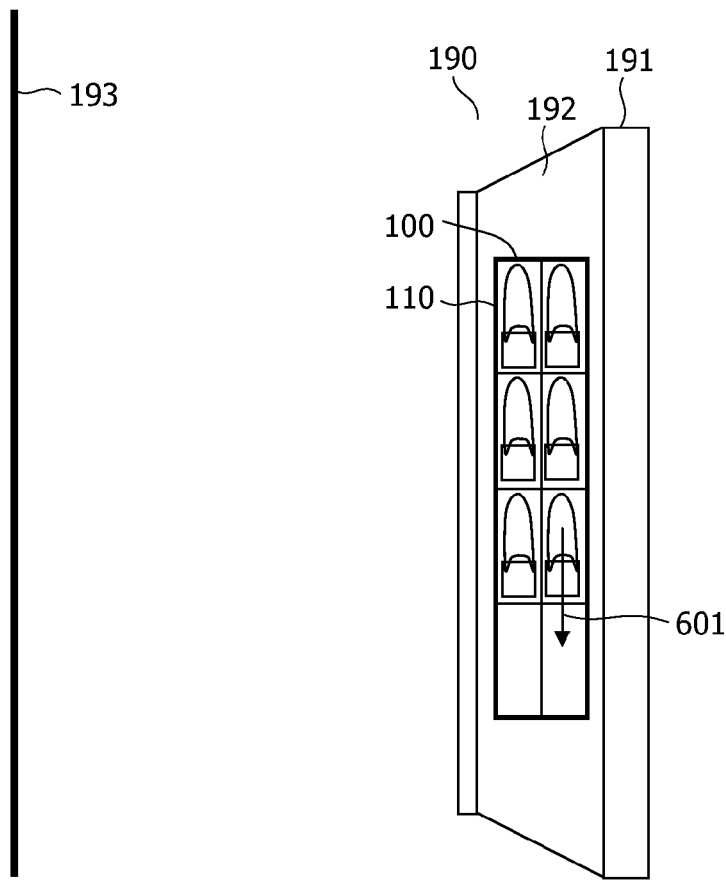
FIG. 6 shows a side view of the display device from FIG. 1A.

FIG. 6 shows a side view of the display device 190 in FIG. 1A. The side view shows how the light emitter array 100 is mounted onto or integrated with an edge 192. The collimating reflectors of the light emitter units 110 collimate light along the edge 192. Thus, the collimators are arranged to receive light from light emitters 201 and collimate the light in a direction 601 substantially parallel with the edge 192, in direction of the floor 602 or the ceiling when the display device is correctly positioned in the living room. Use of collimating reflectors which are configured to collimate light along edges 192 of the display device 190 enables a more compact design of the display device, in comparison with a configuration where the collimators collimate light e.g. in a direction away from the display device 190. Furthermore, since the collimating reflectors 203 extends primarily in a direction along edges 192, the collimating reflectors 203 can be made longer as compared to collimating reflectors extending primarily in a direction pointing away from the display device 190 and, thereby, enable improved collimation capabilities for creation of smaller pixel spots on the wall 193. In comparison, a shorter collimation length would create a larger opening angle for the light bundle which in turn makes pixel spots on the wall 193 larger, possibly to the point of even highly overlapping neighboring pixels.

Distribution of a plurality of light emitter units 210, either in a single row 112 along the edge 192 or in a plurality of rows 112, enables creation of an m×n array of pixel spots on the wall 193. The pixel spots extend a users' viewing experience when watching e.g. a movie, since images on the display 191 can be extended outside the display area by creating a pixel array of colored spots on the wall 193 which mimics spatial extensions of images on the display 191.

In addition to providing the side edges 192 with light emitter arrays 100, also the top and bottom edges may be provided with light emitter arrays to create pixel spots 360 degrees around the display device 190. The collimators of arrays arrange on the top and bottom edges may be arranged to collimate the light in a direction substantially parallel with the top and bottom edges of the display 191 and parallel with the floor 602 or the ceiling.

The invention claimed is:

1. A light emitter array for generating a plurality of output light beams, the light emitter array comprising:
   first and second light emitters having first and second directions of light propagation;
   first and second collimating reflectors arranged to collimate the emitted light from the first and second light emitters along first and second collimation directions; and
   first and second redirection reflectors arranged to change directions of the collimated light propagating along the first and second collimation directions into first and second output directions for generation of first and second output light beams.

2. A light emitter array according to claim 1, where the first and second light emitters are located on a plane, and where the first and second primary collimating reflectors are arranged to collimate light along the first and second collimation directions extending substantially parallel with the plane.

3. A light emitter array according to claim 1, where the first redirection reflector and the second collimation reflector are arranged on a plane and where a space formed between the first redirection reflector and the plane accommodates part of the second collimation reflector.

4. A light emitter array according to claim 1, where the first and second collimating reflectors are arranged to change the direction of light propagation along the first and second directions of the first and second light emitters into first and second collimation directions.

5. A light emitter array according to claim 1, where the first and second collimation directions are substantially parallel.

6. A light emitter array according to claim 1, where the first and second collimating reflectors are distributed on line to form a column of the light emitter units.

7. A light emitter array according to claim 1, where the first and second collimating reflectors are curved in only one plane for collimating light in only one dimension.

8. A light emitter array according to claim 1, where the first and second redirection reflectors are flat mirrors.

9. A display device comprising:
   a display for displaying images; and
   a light emitter array connected to the display, including:
      first and second light emitters having first and second directions of light propagation,
      first and second collimating reflectors arranged to collimate the emitted light from the first and second light emitters along first and second collimation directions,
      first and second redirection reflectors arranged to change directions of the collimated light propagating along the first and second collimation directions into first and second output directions for generation of first and second output light beams.

10. A display device according to claim 9, where the light emitter array is arranged along an edge of the display device so that light from the first and second light emitters is collimated in a direction substantially parallel with the edge of the display.

11. A display device according to claim 9, where the first and second collimating reflectors and the first and second redirection reflectors are distributed in line along an edge of the display device.

12. A method for generating an array of output light beams comprising, the method comprising:
   generating first and second light beams from first and second light emitters having first and second directions of light propagation;
   collimating the first and second light beams using first and second collimating reflectors arranged to collimate the light beams along first and second collimation directions; and
   redirecting the collimated light propagating along the first and second collimation directions into first and second output directions using first and second redirection reflectors for generation of first and second output light beams.

* * * * *